US011321351B2

(12) United States Patent
Sreedharan et al.

(10) Patent No.: US 11,321,351 B2
(45) Date of Patent: May 3, 2022

(54) ADAPTABLE LEGACY STATEFUL WORKLOAD (71) Applicant: International Business Machines Corporation, Armonk, NY (US)

(72) Inventors: Thupale Sreedharan, Bangalore (IN); Rajkumar Paka, Hyderabad (IN); Swathi E P, Bengaluru (IN); Amit Kaktwan, Rishikesh (IN); Padmanabha Venkatagiri Seshadri, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/013,921

(22) Filed: Sep. 8, 2020

(65) Prior Publication Data
US 2022/0075798 A1    Mar. 10, 2022

(51) Int. Cl.
*G06F 16/00* (2019.01)
*G06F 16/27* (2019.01)
(52) U.S. Cl.
CPC ................ *G06F 16/27* (2019.01)
(58) Field of Classification Search
CPC ..................................... G06F 16/27
See application file for complete search history.

(56) References Cited

U.S. PATENT DOCUMENTS

| 5,551,034 | A | 8/1996 | Herz | |
| 7,739,233 | B1 * | 6/2010 | Ghemawat | H04L 67/1095 |
| | | | | 707/610 |
| 9,990,161 | B2 | 6/2018 | Piduri | |
| 10,244,034 | B2 | 3/2019 | Joshi | |
| 10,467,039 | B2 | 11/2019 | Bailey | |
| 2002/0188655 | A1 | 12/2002 | Brown | |

(Continued)

FOREIGN PATENT DOCUMENTS

| CN | 101577716 A | 11/2009 |
| CN | 101661408 A | 3/2010 |
| WO | 2019113216 A1 | 6/2019 |

OTHER PUBLICATIONS

"ASM", Printed Aug. 18, 2020, 2 pages, <https://asm.ow2.io/>.
(Continued)

*Primary Examiner* — Khanh B Pham
(74) *Attorney, Agent, or Firm* — Jordan A. Lewis; Brian M. Restauro (57) ABSTRACT

Embodiments of the present invention provide a computer system a computer program product, and a method that comprises identifying replicated data within a respective data container in a plurality of data containers based on an indicative marker that reflects replication; calculating an amount of time to interact with the identified replicated data based on an alert threshold that, when triggered, alerts remaining data containers in the plurality of data containers; and synchronizing the identified replicated data within each respective data container such that reduces a wait time to interact with the identified replicated data based on a priority order of the calculated amount of time to interact, wherein the priority order places higher calculated interaction times higher than lower calculated interaction times.

13 Claims, 4 Drawing Sheets

(56) References Cited

U.S. PATENT DOCUMENTS

| | | | |
|---|---|---|---|
| 2015/0189013 A1* | 7/2015 | Drobychev | G06F 13/10 709/202 |
| 2018/0088973 A1 | 3/2018 | Subhraveti | |
| 2019/0196918 A1 | 6/2019 | Bulkowski | |
| 2019/0243836 A1 | 8/2019 | Nanda | |
| 2020/0174698 A1* | 6/2020 | Fang | G06F 3/067 |
| 2020/0241754 A1 | 7/2020 | Bett | |
| 2021/0182151 A1* | 6/2021 | Kumar | G06F 11/1451 |
| 2021/0294816 A1* | 9/2021 | Chaganti | G06F 9/5083 |

OTHER PUBLICATIONS

"Lock files", Printed Aug. 18, 2020, 1 page, <https://refspecs.linuxfoundation.org/FHS_3.0/fhs/ch05s09.html>.

"Second moment method", Wikipedia, Last edited on Jun. 30, 2020, 4 pages, <https://en.wikipedia.org/wiki/Second_moment_method>.

"StatefulSets", KubeCon + CloudNativeCon EU 2020 virtual, Aug. 17-20, 2020, 6 pages, <https://kubernetes.io/docs/concepts/workloads/controllers/statefulset/>.

Ahmed, Mohamed, "Kubernetes Patterns: Singleton-Application Pattern", Magalix Blog, Oct. 14, 2019, 7 pages, <https://www.magalix.com/blog/kubernetes-patterns-singleton-application-pattern>.

Lubin, Eric, "VM2Docker: Automating the Conversion from Virtual Machine to Docker Container", Massachusetts Institute of Technology, Feb. 2015, 68 pages.

"Orchestrating Databases in Kubernetes: StatefulSets vs DaemonSets", Jan. 22, 2020, 5 pages, <https://www3.dbmaestro.com/blog/orchestrating-databases-in-kubernetes-statefulsets-vs-daemonsets>.

"Run a Replicated Stateful Application", Downloaded May 11, 2020, 17 pages, <https://kubernetes.io/docs/tasks/run-application/run-replicated-stateful-application/>.

Sobey, Paul, "Volume Replication for High Availability in Kubernetes or OpenShift", StorageOS, Sep. 24, 2018, 5 pages, <https://storageos.com/volume-replication-ha-k8s-openshift>.

"Patent Cooperation Treaty PCT Notification of Transmittal of the International Search Report and the Written Opinion of the International Searching Authority, or the Declaration", International application No. PCT/CN2021/107352, International filing date Jul. 20, 2021 (Jul. 20, 2021), dated Oct. 18, 2021 (Oct. 18, 2021), 10 pages.

* cited by examiner

ADAPTABLE LEGACY STATEFUL WORKLOAD

BACKGROUND

The present invention relates generally to the field of data consistency, and more specifically dynamic consistency mechanisms for container orchestration.

A legacy application is a software program that is outdated or obsolete. Although a legacy application still works, it may be unstable because of combability issues with current operating systems, browsers, and information technology infrastructures. Often referencing a program, application, or system as legacy means that it paved the way for the standards that would follow it.

Container orchestration refers to the process of organizing the work of individual components and application layers. Container orchestration automates the deployment, management, scaling, and networking of containers. Container orchestration can be used in any environment where one uses containers. This helps deploy the same application across different environments without needing to redesign it. Generally, container orchestration is used to automate and manage tasks. Furthermore, container orchestration tools provide a framework for managing containers and microservices architecture at scale.

Data consistency refers to the accessed data being available. Data consistency in database systems refers to the requirement that any given database transaction must change affected data only in allowed ways. Any data written to the database must be valid according to all defined rules, including constraints, cascades, triggers, and any combination thereof. This does not guarantee correctness of the transaction in all ways the application programmer might have wanted (that is the responsibility of application-level code) but merely that any programming errors cannot result in the violation of any defined database constraints.

Overlaying means the process of transferring a block of program code or other data into main memory, replacing what is already stored. Overlaying is a programming method that allows programs to be larger than the computer's main memory. An embedded system would normally use overlays because of the limitation of physical memory, which is internal memory for a system-on-chip, and the lack of virtual memory facilities.

SUMMARY

Embodiments of the present invention provide a computer system a computer program product, and a method that comprises identifying replicated data within a respective data container in a plurality of data containers based on an indicative marker that reflects replication; calculating an amount of time to interact with the identified replicated data based on an alert threshold that, when triggered, alerts remaining data containers in the plurality of data containers; and synchronizing the identified replicated data within each respective data container such that reduces a wait time to interact with the identified replicated data based on a priority order of the calculated amount of time to interact, wherein the priority order places higher calculated interaction times higher than lower calculated interaction times.

DETAILED DESCRIPTION

Embodiments of the present invention recognize the need for an improvement to current modern shared volume interaction of legacy, stateful process workloads that are not engineered to leverage the fast-paced developments and new features in the orchestration of workload. For example, the workload is a multi-process workload writing to a file through a locking mechanism is defined as a stateful interaction and would yield multiple data containers with their own volumes that would remain inconsistent because locking would not work across volumes. On the other hand, if the workloads are treated as replicated data that forces the replicated data container to mount the same volume, then contention, which is defined later in this detailed description, does not scale well with the increasing replicated data count thereby degrading the system. Embodiments of the present invention improves the current modern shared volume interaction of legacy, stateful process workload by modernizing shared volume interaction of legacy workloads to support stateful replication and orchestration while mitigating the performance degradation by overlaying a consistency framework and inter-leaving the synchronization process. Embodiments of the present invention provides systems, methods, and computer program products for a solution to modernize shared volume interactions of legacy and generate a mechanism that supports a form of consistent to orchestrate stateful workloads that does not pre-suppose the availability of consistency in legacy systems and provide interleaved synchronization of volume replicas to balance performance with consistency. Currently, legacy systems are not engineered to leverage the fast-paced developments and new features in the orchestration of newer workloads. Generally, legacy, stateful process workload technology does not support any form of consistency to orchestrate stateful workloads that do not possess consistency mechanisms to operate across logical constructs between data containers within stateful sets. Commonly, these use cases are seen in legacy process workloads that are built to work within a volume management, either as a single process or as a multi-process interacting to advisory locks. Embodiments of the present invention are an improvement to current legacy systems by using an overlain consistency mechanism that provides interleaved synchronization of volume replicas to balance performance with consistency that does not pre-suppose the availability of consistency in legacy software. Embodiments of the present invention distributes data into separate sets, monitors the separate steps, discovers control paths for request types between the separate sets, estimates volume-access probabilities across the separate sets, and prioritizes the separate sets based on volume synchronization.

Figure 1:
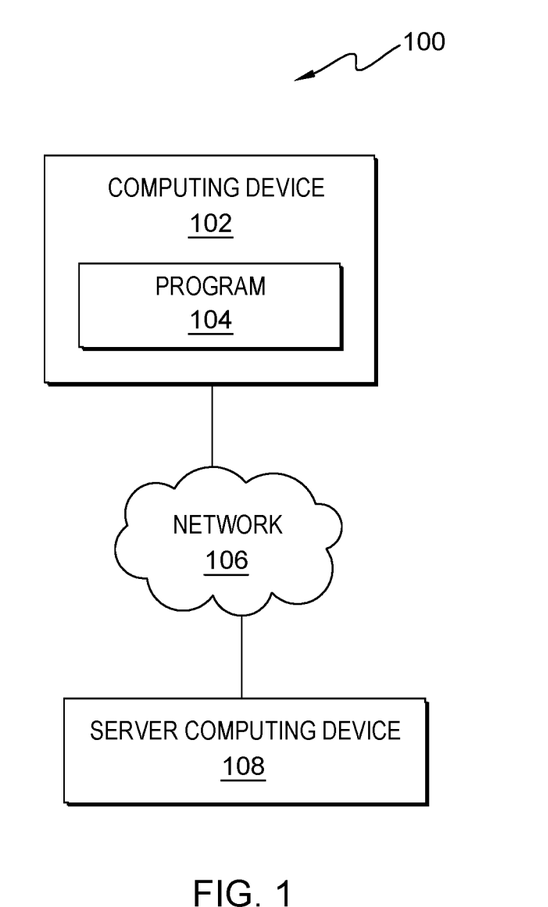
FIG. 1 is a functional block diagram depicting an environment with a computing device connected to or in communication with another computing device, in accordance with at least one embodiment of the present invention.

FIG. 1 is functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, smart appliances, smart devices, or any other computing devices known in the art. In certain embodiments, the computing device 102 and the server computing device 108 may represent computing devices utilizing multiple computers or components to act as a single pool of seamless resources when accessed through a network 106. In this embodiment, the computing device 102 may be defined as an orchestrator that stores replicated data and mounted volumes and performs synchronization of stateful sets. Generally, the computing device 102 and the server computing device 108 may be representative of any electronic devices, or a combination of electronic devices, capable of executing machine-readable program instructions, as described in greater detail with regard to FIG. 4.

The computing device 102 may include a program 104. The program 104 may be a stand-alone program on the computing device 102. In another embodiment, the program 104 may be stored on a server computing device 108. In this embodiment, the program 104 modernizes shared volume interaction of legacy, stateful single process or multi-process workload to support stateful replication and orchestration while mitigating a performance degradation by overlaying a consistency framework that monitors the locking and volume interactions of the replicated stateful workloads and interleaving the synchronization process between stale and up-to-date replicas, within the gaps discovered in the volume access patterns of the control paths of the workloads. In the embodiment, the program 104 overlays the consistency framework and interleaves the synchronization process by packaging legacy data into stateful sets, monitoring the stateful steps, discovering control paths for request types between the control blocks and replicated data located within stateful sets, estimating volume-access probabilities across the stateful sets, and prioritizing the stateful sets based on volume synchronization estimate.

In this embodiment, the program 104 packages (i.e., distributes) legacy data into stateful sets by extracting process binaries from a database and converting the extracted process binaries into containers.

In this embodiment, the program 104 monitors changes in a volume manager database and locking mechanism created for the stateful sets by dispatching inputs on access pattern information over a predetermined period of time associated with each stateful set and synchronizing replicated data across the stateful sets. In this embodiment, replicated data is defined as data that is copied within the separate set. In this embodiment, the program 104 monitors single process applications and multi-process application with advisory locks. In this embodiment, the program 104 monitors change within the stateful sets over a fixed period of time.

In this embodiment, the program 104 discovers control paths for request types by using a run-time analysis of the process, and these control paths depended on the type of data that is stored within the stateful sets. In this embodiment, the program 104 determines a logical distance between components located inside the stateful sets, such as control blocks and replicated data. In this embodiment, the program 104 identifies replicated data within a respective data container in a plurality of date containers based on an indicative marker that reflects replication.

In this embodiment, the program 104 estimates volume-access probabilities by computing the volume access probabilities based on the discovered control paths. In this embodiment, the estimate is based on the difference between the time it takes for a discovered control path to reach a given data-replica in the volume and synchronization time for the data replica. In this embodiment, the program 104 calculates an amount of time to interact with the identified replicated data based on an alert threshold that, when triggered, alerts remaining data containers in the plurality of data containers.

In this embodiment, the program 104 prioritizes volume synchronization based on the estimated volume-access probabilities to discover inter-leaving opportunities and a prioritization order for synchronization of the volumes. In this embodiment, the program 104 prioritizes based on an imminent lock contention event or prioritizes based on new request types of a separate set that has a high-estimated probability. In this embodiment, the program 104 synchronizes the replicated data within each respective data container in order to reduce a wait time to interact with the identified replicated data based on a priority order of the calculated interaction time, wherein the priority order places higher calculated interaction times higher than lower calculated interaction times.

The network 106 can be a local area network ("LAN"), a wide area network ("WAN") such as the Internet, or a combination of the two; and it may include wired, wireless, or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 and may communicate with the computing device 102 via the network. The server computing device 108 may be a single computing device, a laptop, a collection of servers, and other known computing devices. In this embodiment, the server computing device 108 may be an external device connected to the computing device 102 via the network 106.

Figure 2:
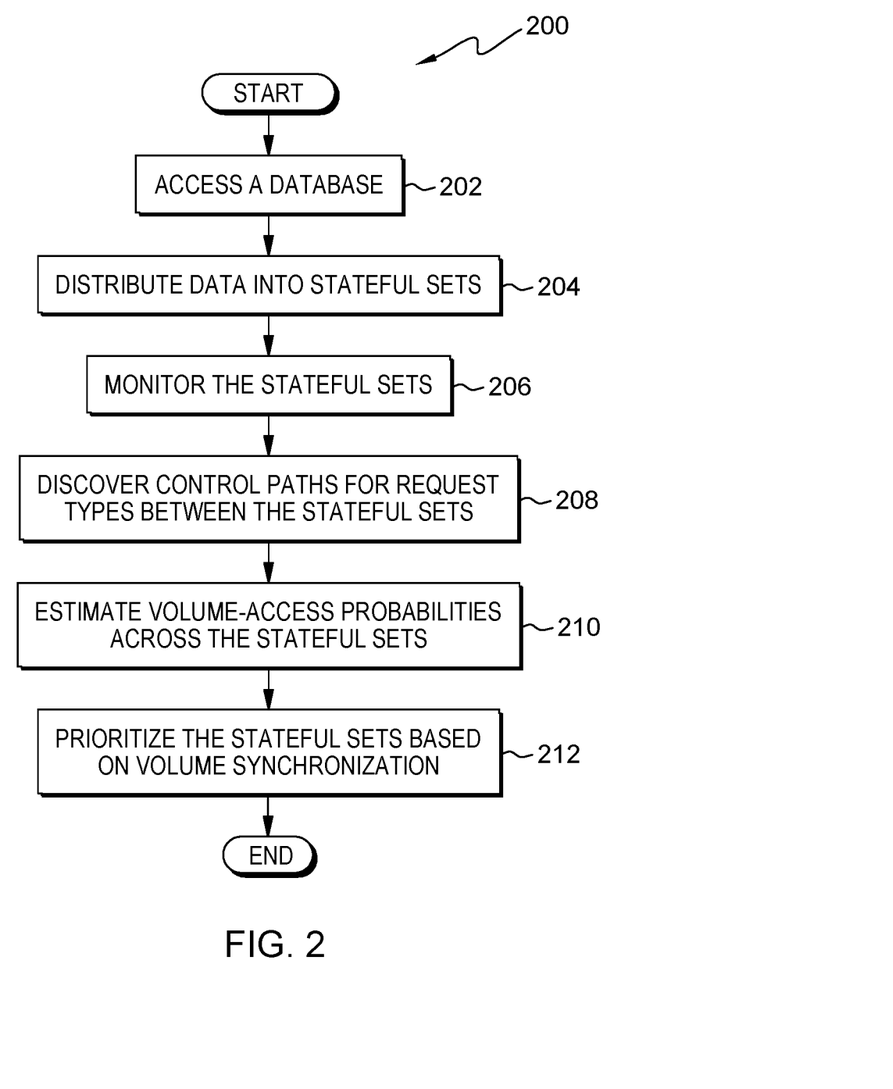
FIG. 2 is a flowchart illustrating operational steps for dynamically generating consistency mechanisms for container orchestration, in accordance with at least one embodiment of the present invention.

FIG. 2 is a flowchart 200 illustrating operational steps for dynamically generating consistency mechanisms for container orchestration, in accordance with at least one embodiment of the present invention.

In step 202, the program 104 accesses a database. In this embodiment, the program 104 receives opt-in/opt-out permission from a user to gain access to the database. In this embodiment, the program 104 accesses a database that may be defined as a volume manager. For example, the program 104 accesses a volume manager database that stores data catalogs for multiple users.

In step 204, the program 104 packages legacy processes into stateful sets. In this embodiment, a legacy process is an outdated or obsolete process and may be unstable because of compatibility issues with current operating systems, browsers and information technology infrastructures. In this embodiment, a stateful set manages deployment and scaling of data containers and provides ordering and details associated with each data container within the stateful set. Furthermore, stateful is defined as a stable (e.g., unchanging) and ordered program that tracks of the state of interaction by setting values in a storage field designated for that purpose. In this embodiment, the program 104 distributes data into stateful sets by extracting process binaries from the accessed database and converting the extracted process binaries into data containers. In this embodiment, process binaries are defined as the output of a random event with two exhaustive and mutually exclusive outcomes. For example, the program 104 distributes the data from the database into three identical and stateful sets. In another embodiment, the program 104 distributes the data from the database into multiple stateful sets and converts the stateful sets into data containers, and the data of the volume manager database is replicated and stored into a stateful set within the orchestrator or computing device 102.

In another embodiment and in response to converting the stateful sets into data containers, the program 104 mounts the volumes on the data containers by replicating the data within the volume manager database without alerting the other stateful sets of the replication because when a stateful set that is defined as a legacy process learns of data replication, the data stored within that stateful set will be stale in response to the stateful set being alerted of the data replication. In this embodiment, a volume manager database is defined as a directory with data that is accessible to all data containers running within the stateful sets and mounting a volume is defined as storing the replicated data within the computing device 102.

In step 206, the program 104 monitors the stateful sets. In this embodiment, the program 104 monitors changes to replicated data between legacy process that maintain mechanism locks for and stateful sets with replicated data. In this embodiment, the program 104 monitors the orchestrated replication of data within the stateful sets by dispatching inputs on access patterns associated with each stateful set and synchronizing replicated data across the stateful sets. For example, the program 104 observes that in the first stateful set, the replicated data was accessed; in the second stateful set, the replicated data was not accessed; and in the third stateful set, the data was not allowed to replicate by a lock mechanism.

In this embodiment, the program 104 monitors the stateful set of a single process application by freezing a data storage container within the stateful set when the program 104 detects contention or replication and allows one data storage container to perform an update at a time. In this embodiment, contention is defined as imminent access to the same replicated data on the respective volume for each stateful set.

In another embodiment, the program 104 monitors the stateful set of a multi-process application by monitoring the access to lock files and monitors for contention and replication. In this embodiment, the replicated data within the stateful set for a multi-process application is used to inform subsequent activities or sessions on imminent contention and scheduling steps for synchronization without alerting other stateful sets of the contention or replication.

In step 208, the program 104 discovers control paths for request types between the stateful sets. In this embodiment, the program 104 discovers control paths for request types between the stateful sets by determining a logical distance (e.g., distance between the bitstring representation of specific elements) between control blocks and replicated data within the stateful sets using a run-time analysis of the process, and these control paths access a sub-set of replicated data of the volume manager database. In this embodiment and when the replication or contention of data alerts the stateful set, the program 104 renders the replicated data stale in response to accessing at least one stateful set that stores the replicated data within a single process application. In this embodiment and when there is no lock mechanism in the stateful set, the program 104 does not render the replicated data stale in response to accessing at least one stateful sets within a multi-process application due to the other stateful sets not being alerted of the.

In another embodiment, the program 104 discovers control paths for request types between the stateful sets by performing sand-box execution for input request types to identify control paths. In this embodiment, a sand-box execution isolates application from critical systems resources and other programs and provides an extra layer of security that prevents harmful application from negatively affecting the stateful set. In this embodiment, the program 104 performs the sand-box execution to prevent a negative effect on the plurality of stateful sets. In this embodiment, the program 104 discovers control paths from control blocks, wherein control blocks are considered a data structure used to store information about the synchronization process and also known as the data containers located within the stateful sets, and data replicated storage units, which are also located within the stateful sets. In this embodiment, a control block is defined as a data structure used by computer operating systems to store all the information about a process. In an example where there are five stateful sets, the program 104 can map a path from each of the stateful sets to another. For example, the program 104 maps a path from control block ("CB") 1 to CB 2 and CB 3, while also mapping a different path to data replication ("DR") 1:1 associated with CB 2 and DR 2:2 associated with CB 3. Furthermore, the program 104 maps a path from CB 3 to CB 4 and CB 5, while also mapping different paths to DR 3:1 associated with CB 4 and DR 4:2 associated with CB 4. In this embodiment, the program 104 discovers control paths for request types to assist with synchronization of the stateful sets when replicated data is spread across multiple stateful sets and accessing a data container that stores replicated data renders other replicated data stale.

In step 210, the program 104 estimates volume-access probabilities across the stateful sets. In this embodiment, the program 104 estimates volume-access probabilities across the separate sets by computing the volume access probabilities based on the discovered control paths. In this embodiment, the program 104 estimates volume-access probabilities across the stateful sets by utilizing the following:

$$T = t^{access} - t^{sync} \quad (1)$$

With respect to equation 1, "T" is a random variable that represents the difference between the "$t^{access}$", time it takes for a control path to hit a given replicated data in the volume and "$t^{sync}$", synchronization time for the replicated data, which varies with the type of data container and location of the replicated data within the data container. For example, the time it takes to access a stateful set is measured as 4 and the time it takes to synchronize the stateful set is 2. Thus, "T" equals 2 as the difference when the access time and the synchronization time.

In another embodiment, the program 104 estimates volume-access probabilities across the stateful sets by utilizing the following:

$$Pr(T > 0) \geq \frac{(E[T])^2}{(E[T^2])} \quad (2)$$

With respect to equation 2, "Pr (T>0)" represents the probability, "(E[T])" represents the expected value of the random variable "T", and "(E[T$^2$])" represents the second moment. In this embodiment, the program 104 uses equation (2) to derive the lower-bound probability that "T" is greater than 0, which indicates the probability that the synchronization happens before the access happens. For example, the program 104 estimates the time it would take for the control path from the accessed databased to the stateful set that stores the replicated data to synchronize the replicated data based on data volume of the separate sets. For example, "(E[T])" equals 1 and that number squared remains 1. Furthermore, "E[T²])" equals 2, and $$\frac{(E[T])^2}{(E[T^2])}$$

equals 0.5 as result of 1 divided by 2. Thus, "T", which equals 2, is greater than 0.5. In this embodiment, the program 104 verifies the calculated volume-access probability by dividing the calculated volume access probability by an estimated volume access probability.

In step 212, the program 104 prioritizes the stateful sets based on data replication synchronization. In this embodiment, the program 104 prioritizes the synchronization based on the estimated volume-access probabilities to discover inter-leaving opportunities and a prioritization order for synchronization of the replicated data. In this embodiment, there are multiple methods that the program 104 may choose from to prioritize the stateful sets. In this embodiment, the program 104 prioritizes the stateful sets by prioritizing imminent lock contention and prioritizing requests to replicate data within stateful sets. In this embodiment, the program 104 prioritizes the stateful sets based on imminent lock contention events to reduce the wait time at the lock-contention for data containers updated with replicated data. In this embodiment, the program 104 indicates that the data container has identified control paths are already in execution and a low probability "Pr" due to the presence of a lock-contention that demands replicated data. In this embodiment, a low probability is defined as a measurement when "T", which the measured wait time for a stateful set to be accessed by the program 104, is equal to or less than 0. In this embodiment, the program 104 further defines this wait time as a lull in when stateful sets are accessed, and the lull provides a synchronization opportunity for the program 104 synchronize replicated data within the data containers stored within the stateful sets. For example, the program 104 ranks the stateful sets that remained neutral above the separate set where the volume decreased, and the ranking of the stateful sets may be dynamically adjusted based on the computed estimation of probability.

In this embodiment, the program 104 prioritizes stateful sets by prioritizing new requests. In another embodiment, the program 104 prioritizes request types that have higher probabilities by inter-leaving the replicated data and ordering the requests with higher probabilities over replicated data accessed by control paths. In this embodiment, the program 104 defines high probability as a "T" that is greater than 0. In this embodiment, the program 104 prioritizes stateful sets by prioritizing new requests by utilizing the following:

$$\max_r \prod_{i \in R_{c,r}} \frac{(E[T_i])^2}{(E[T_i^2])} \quad (3)$$

With respect to equation 3, the program 104 utilizes equation 3 to determine a maximum of the combined probabilities of access to replicated data over the entire control path for each request.

Figure 3:
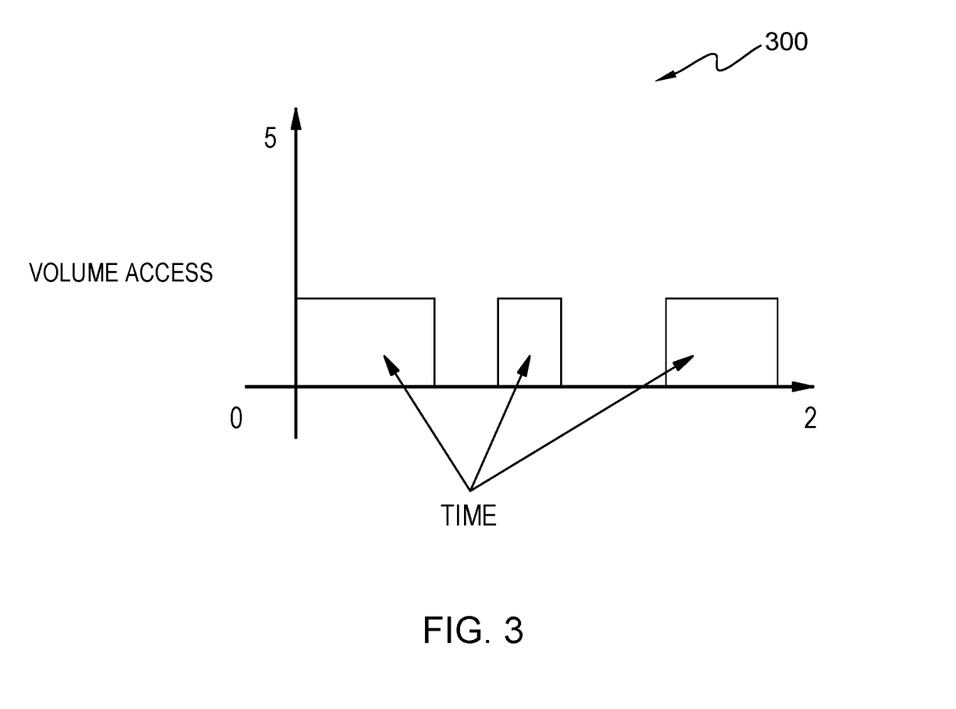
FIG. 3 is a graph depicting a comparison of time versus access of a stateful set, in accordance with an embodiment of the present invention.

FIG. 3 depicts a graph 300 displaying a comparison of time versus access of a stateful set, in accordance with an embodiment of the present invention. In this embodiment, the graph 300 has a y-axis defined as access of the stateful set and an x-axis as time. In this embodiment, the graph 300 depicts lulls as when the access of the stateful set is greater than zero. In this embodiment, the lull provides a synchronization opportunity for the program 104 to synchronize replicated data within the stateful sets. In this embodiment and during at least one lull, the program 104 interleaves the stateful sets. In this embodiment, the program 104 defines interleaving as a synchronization process between stale and up-to-date data. In this embodiment, the program 104 identifies the stateful set access pattern of the discovered control paths within the lulls based on the determined distance between requested control blocks and data replication associated with the requested control blocks.

Figure 4:
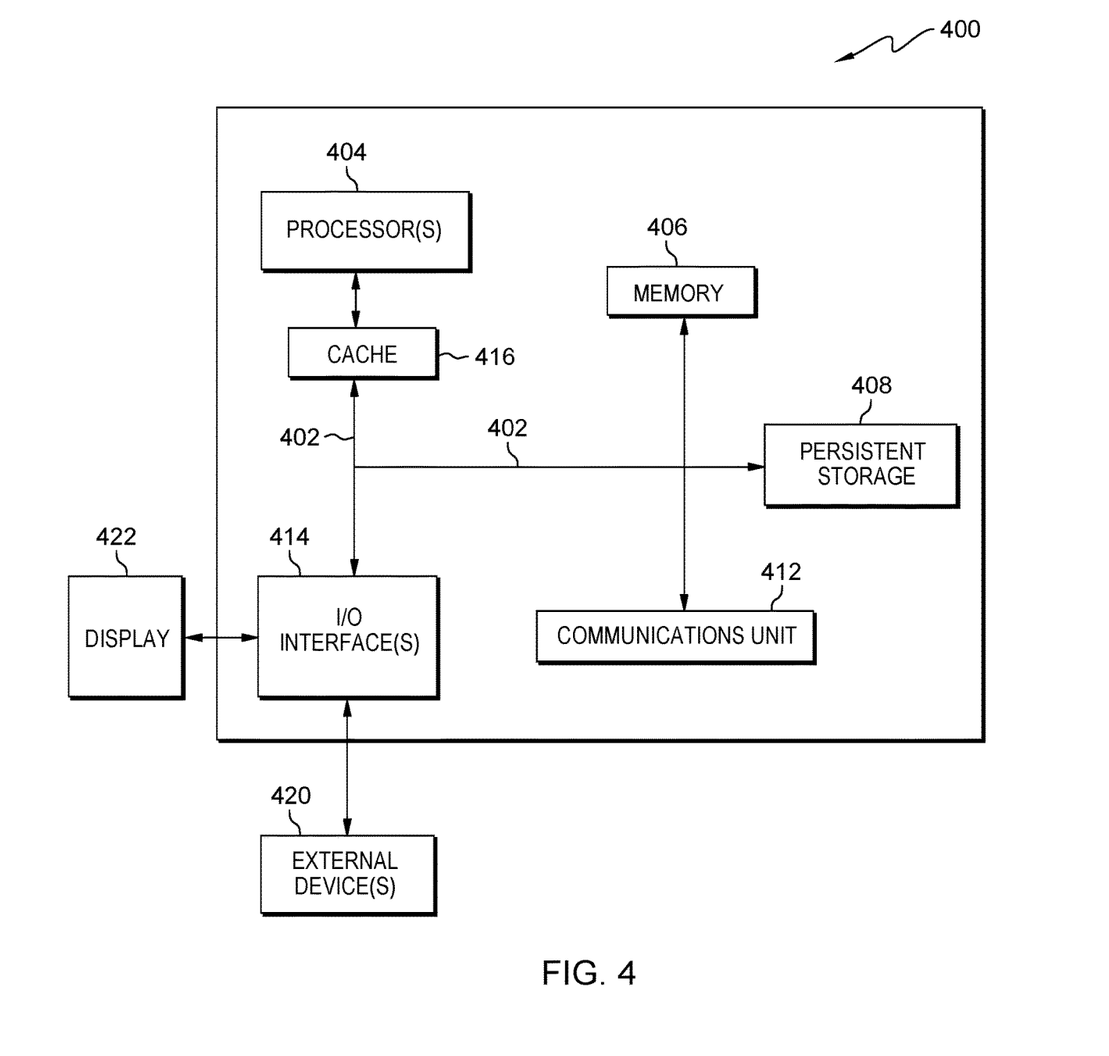
FIG. 4 depicts a block diagram of components of computing systems within a computing display environment of FIG. 1, in accordance with an embodiment of the present invention.

FIG. 4 depicts a block diagram of components of computing systems within a computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 412, and an input/output (I/O) interface(s) 414. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. The program 104 may be downloaded to the persistent storage 408 through the communications unit 412.

The I/O interface(s) 414 allows for input and output of data with other devices that may be connected to a mobile device, an approval device, and/or the server computing device 108. For example, the I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 414. The I/O interface(s) 414 also connect to a display 422.

The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

What is claimed is:

1. A computer-implemented method comprising:
monitoring volume changes and locks created on volumes for replicas of packaged stateful sets using either single process applications or multi-process applications with advisory locks;
discovering control paths for received requests for containerized processes accessing at least a subset of the replicas of the packaged stateful sets;
estimating volume access probabilities for the discovered control paths based on a difference between a time it takes for a control path of the discovered control paths to access a respective data replica of the packaged stateful sets and a synchronization time for that data replication;
prioritizing volume synchronization based, at least in part, on imminent lock contention events and request type; and
synchronizing the packaged stateful sets according to the prioritized volume synchronization.

2. The computer-implemented method of claim 1, further comprising packaging data from a volume manager into a plurality of stateful sets by extracting process binaries from the volume manager and converting the extracted process binaries into at least one stateful set in the plurality of stateful sets.

3. The computer-implemented method of claim 1, wherein monitoring volume changes and locks created on volumes for replicas of packaged stateful sets using either single process applications or multi-process applications with advisory locks comprises:
 accessing pattern information over a predetermined period of time associated with each packaged stateful set; and
 replicating accessed pattern information within each data container within each packaged stateful set.

4. The computer-implemented method of claim 1, wherein discovering control paths for request types between the stateful sets comprises:
 identifying at least one control block within a plurality of control blocks within the packaged stateful sets; and
 in response to identifying at least one control block, identifying at least one replicated data set within the packaged stateful sets.

5. The computer-implemented method of claim 4, further comprising determining a logical distance between the at least one control block and the at least one replicated data set within the packaged stateful sets.

6. The computer implemented method of claim 1, wherein discovering control paths for received requests for containerized processes accessing at least a subset of the replicas of the packaged stateful sets comprises performing a sand-box execution for the received requests by input request types that prevents a negative effect on the plurality of the stateful sets.

7. A computer program product comprising:
 one or more computer readable storage media and program instructions stored on the one or more computer readable storage media, the program instructions comprising:
  program instructions to monitor volume changes and locks created on volumes for replicas of packaged stateful sets using either single process applications or multi-process applications with advisory locks;
  program instructions to discover control paths for received requests for containerized processes accessing at least a subset of the replicas of the packaged stateful sets;
  program instructions to estimate volume access probabilities for the discovered control paths based on a difference between a time it takes for a control path of the discovered control paths to access a respective data replica of the packaged stateful sets and a synchronization time for that data replication;
  program instructions to prioritize volume synchronization based, at least in part, on imminent lock contention events and request type; and
  program instructions to synchronize the packaged stateful sets according to the prioritized volume synchronization.

8. The computer program product of claim 7, wherein the program instructions stored on the one or more computer readable storage media further comprise:
 program instructions to package data from a volume manager into a plurality of stateful sets by program instructions to extract process binaries from the volume manager and program instructions to convert the extracted process binaries into at least one stateful set in the plurality of stateful sets.

9. The computer program product of claim 7, wherein the program instructions to monitor volume changes and locks created on volumes for replicas of packaged stateful sets using either single process applications or multi-process applications with advisory locks comprise:
 program instructions to access pattern information over a predetermined period of time associated with each packaged stateful set; and
 program instructions to replicate accessed pattern information within each data container within each packaged stateful set, program instructions to synchronize replicated accessed pattern information across each data container within the plurality of data containers.

10. The computer program product of claim 7, wherein the program instructions to discover control paths for request types between the stateful sets comprise:
 program instructions to identify at least one control block within a plurality of control blocks within the packaged stateful sets; and
 in response to program instructions to identify at least one control block, program instructions to identify at least one replicated data set within the packaged stateful sets.

11. The computer program product of claim 10, wherein the program instructions stored on the one or more computer readable storage media further comprise program instructions to determine a logical distance between the at least one control block and the at least one replicated data set within the packaged stateful sets.

12. The computer program product of claim 7, wherein the program instructions to discover control paths for request types between the stateful sets comprise program instructions to perform a sand-box execution for input request types that prevents a negative effect on the plurality of the stateful sets.

13. A computer system comprising:
 one or more computer processors;
 one or more computer readable storage media; and
 program instructions stored on the one or more computer readable storage media for execution by at least one of the one or more processors, the program instructions comprising:
  program instructions to monitor volume changes and locks created on volumes for replicas of packaged stateful sets using either single process applications or multi-process applications with advisory locks;
  program instructions to discover control paths for received requests for containerized processes accessing at least a subset of the replicas of the packaged stateful sets;
  program instructions to estimate volume access probabilities for the discovered control paths based on a difference between a time it takes for a control path of the discovered control paths to access a respective data replica of the packaged stateful sets and a synchronization time for that data replication;
  program instructions to prioritize volume synchronization based, at least in part, on imminent lock contention events and request type; and
  program instructions to synchronize the packaged stateful sets according to the prioritized volume synchronization.

\* \* \* \* \*